May 14, 1963 — G. M. DUNN — 3,089,461

BIRD FEEDER WITH FLEXIBLE, SLIDABLE, ARCHED ROOF

Filed Feb. 3, 1961

INVENTOR.
GILBERT M. DUNN
BY Pearson & Pearson
ATTORNEYS

United States Patent Office 3,089,461
Patented May 14, 1963

3,089,461
BIRD FEEDER WITH FLEXIBLE, SLIDABLE, ARCHED ROOF
Gilbert M. Dunn, 14 E. Canal St., Penacook, N.H.
Filed Feb. 3, 1961, Ser. No. 87,016
10 Claims. (Cl. 119—51)

This invention relates to bird feeders of the type usually mounted on a post, or attached to the windowsill of a dwelling.

The feeding of birds during the winter months is usually somewhat discriminatory on the part of the householder in that certain smaller birds are desired to be fed, but larger birds such as pigeons, and creatures such as squirrels, are not welcomed at the feeder. There have been many types of bird feeders proposed in the art in which undesirable larger birds, as well as squirrels, have been denied access to the feeder by electric shock systems, sharp edges, screens or the like, but sometimes these expedients have frightened away the smaller birds.

It is the object of this invention to provide a bird feeder with a horseshoe arched roof of flexible, transparent, self supporting material which is freely slidable in arcuate side wall grooves for adjusting the height of the bird opening to accommodate only the size of bird it is desired to feed.

Another object of the invention is to provide a bird feeder with hard, smooth exterior faces on the bottom and side walls and a hard, smooth horseshoe arched roof, or cover, whereby large birds and squirrels cannot secure or maintain a foothold, but small birds can fly through an adjustable opening to light on the floor of the feeder.

A further object of the invention is to provide a bird feeder with a flexible, transparent, rounded roof freely slidable in open ended curved grooves in the side walls whereby the roof can be slid forwardly to insert food from a window, can be slid vigorously to shake off accumulated snow and can be removed entirely for cleaning the feeder or to attract birds to the station without the interference of a roof or cover.

Still another object of the invention is to provide a horseshoe-arched, transparent plastic roof slidably mounted on a bird feeder wherein the plastic is reinforced by a pair of bars of rigid material along its forward and rearward edges which slide with the roof and is supported centrally by at least one perch rod which is fixed to the feeder.

A still further object of the invention is to provide a squirrel proof, pigeon proof feeding tray wherein a curved, horseshoe-arched roof overhangs the tray and is slidably adjustable to vary the size of the entrance opening thereby causing bird enemies to slide off the roof and causing snow to cascade off the roof.

Other objects and advantages of the invention will be apparent from the claims, from the description of the drawing, and from the drawing in which:

Figure 1:
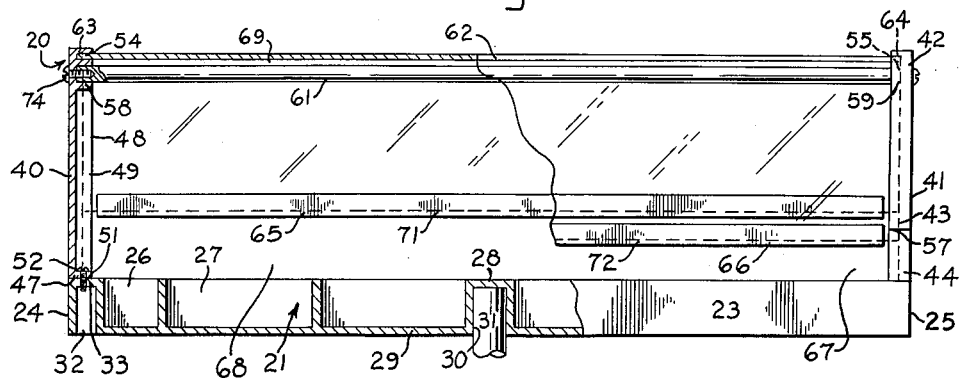
FIGURE 1 is a front elevation of a bird feeder constructed in accordance with the invention, partly in section on line 1—1 of FIGURE 2.
Figure 2:
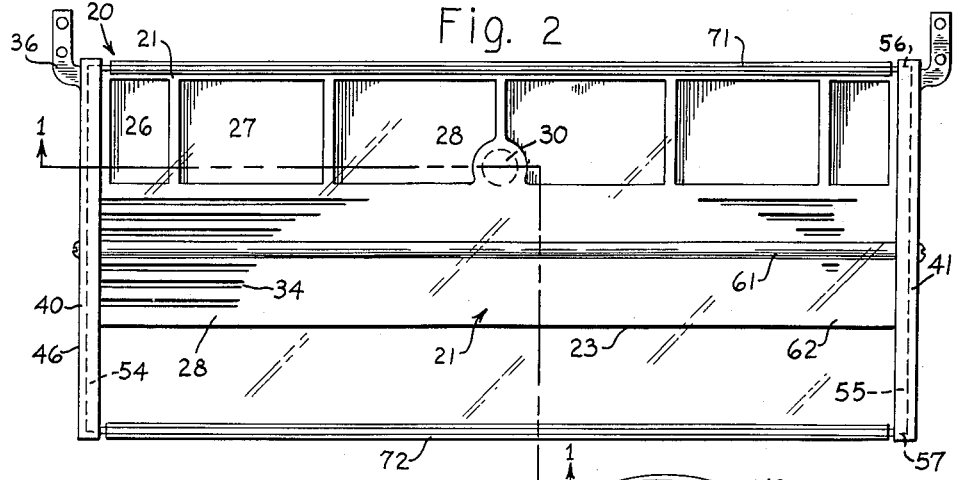
FIGURE 2 is a plan view of the bird feeder shown in FIGURE 1.
Figure 3:
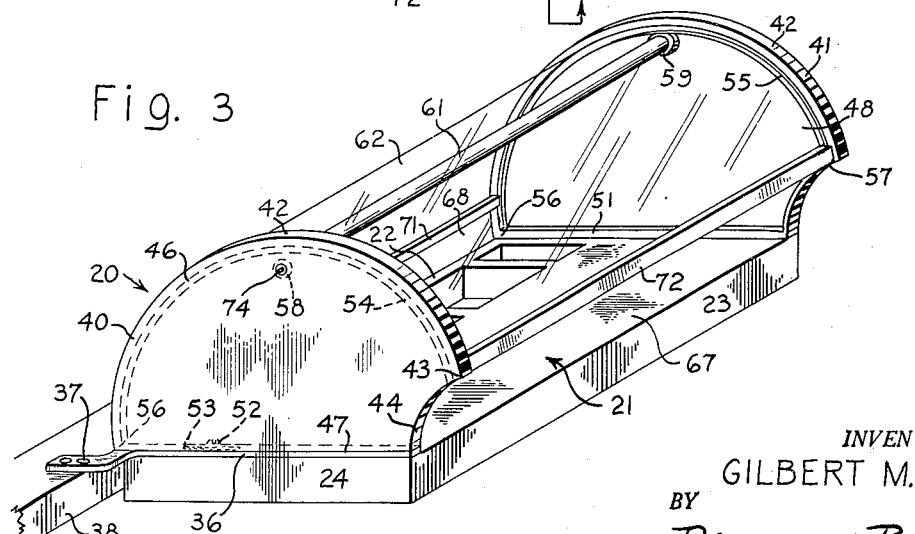
FIGURE 3 is an isometric view of the bird feeder shown in FIGURES 1 and 2.

As shown in the drawing, the bird feeder 20 of the invention includes a rectangular floor 21 having the rearward edge 22, the forward edge 23 and the opposite side edges 24 and 25. Preferably the floor 21 is formed of hard, smooth plastic material of any well known type, and forms a feed tray by reason of the recesses such as 26 and 27 in the upper face 28 thereof. The lower face 29 of floor 21 is recessed at 30 for receiving a supporting post 31 and is recessed along the side edges 24 and 25 as at 32 to form a web 33 for connection of the side walls. A number of elongated grooves such as 34 may also be provided in the upper face 28 for drainage and for better traction of the birds alighting on the tray. A slidably, adjustable supporting strap 36, having suitable screw holes 37 extends rearwardly from each opposite side edge of the floor 21 for mounting the feeder on a windowsill 38.

A pair of identical, vertical side walls 40 and 41 are demountably fixed proximate the side edges 24 and 25 of the floor, or tray, 21, each side wall being of arcuate outline with a rounded edge 42 to deny a foothold to predatory creatures. Each side wall is preferably in the form of a major segment of a circle to define a horseshoe arch with a forward portion 43 overhanging the forward edge 23 of the floor 21 and with a cut away portion designated at 44. The side walls 40 and 41 are preferably formed of hard smooth plastic material, similar to that of the floor 21, the exterior, or outer faces such as 46 offering no foothold to pigeons or squirrels. The lower edge 47 of each side wall is flattened to rest on the webs 33 of the floor 21 and the inner face 48 of each side wall is recessed to form a peripheral rim 49 with a flat lower portion 51. Screws 52 are provided to removably connect the rim 51 with the web 33 and may also pass through elongated slots 53 in the straps 36 for tightening the straps in various positions.

Each side wall 40 and 41 is provided with oppositely disposed, inward facing, continuous arcuate grooves 54 or 55 of curved, or horseshoe arch, configuration conforming to the rounded edge 42. Each groove such as 54 includes an open end 56 proximate the rearward edge 22 of the floor 21 and extends upwardly, then forwardly and then downwardly to an opposite open end 57 in the overhanging portion 43 of the side wall. In addition to the continuous, horseshoe arched, open ended grooves 54 and 55 a pair of oppositely disposed sockets 58 and 59 are recessed in the inner faces 48 of the side walls to accommodate a combined cross rod and perch rod 61. The sockets 58 and 59 are in the upper central portion of the side walls proximate the grooves 54 and 55 so that the rod 61 will extend parallel to the floor and have its upper portion flush with the lower wall of the grooves.

A unitary, flexible transparent, self-supporting roof, or cover, 62 is removably mounted in the grooves 54 and 55 and is preferably of a hard, smooth, impermeable plastic material capable of bending through an arc without fracture. The side edges 63 and 64 of the roof 62 are received in the grooves 54 and 55 with the roof extending across the top of the feeder in the shape of a horseshoe arch and the side edges 63 and 64 are freely slidable in the continuous, rounded, unobstructed grooves 54 and 55 to permit ready insertion, adjustment or removal of the roof. The rearward edge 65 of the roof 62 is normally close to the rearward edge 22 of floor 21 to shut out drafts while the forward edge 66 of the roof is normally located at the forward, open ends 57 of the grooves 54 and 55 to overhang the forward edge 23 of the floor 21. An entrance opening 67 is thus defined by the forward edge 23 of the floor, the cut-away portions 44 of the side walls 40 and 41 and the forward edge 66 of the roof 62 through which the birds may have access to the feeder floor, or tray, 21. The entrance opening 67 may be reduced in height by sliding the roof 62 forwardly so that the forward edge 66 is entirely out of the grooves 54 and 55 and depends one or more inches below the overhanging portions 43 of the side walls. Birds of any desired size may fly under the forward edge 66 while larger birds are unable to pass through the opening from the front or from the sides. If a large bird, or a squirrel manages to arrive on the transparent arched, or domed, roof 62 its curvature and slippery, hard face causes such predators to slide off the roof. The forward sliding of the roof 62 for decreasing the distance between edges 23 and 66 in the embodiment illustrated causes a corresponding increase in the distance between the rearward edges 22 and 65, but the resulting opening 68 is still too small for the entrance of undesirable larger creatures. If desired, the lateral dimension of roof 62 may be such that the rearward edge 65 is normally well below the rearward edge 22 of floor 21 whereby decreasing the height of the forward opening does not produce a rearward opening at all.

The sliding roof, or cover, 62 may be slid rearwardly to increase the height of the entrance opening 67 to any amount desired because the grooves 54 and 55 have open ends and the rearward edge 65 may hang below the feeder. Roof 62 may also be slid forwardly for the insertion of bird feed through the rearward entrance opening 68, when the feeder is mounted on a windowsill. The roof 62 may be slidably removed entirely from grooves 54 and 55 to clean the feeder, to shake off snow or to permit birds to become used to the device as an open feed tray before the tray is covered.

The flexible roof 62 is self supporting but support is also provided by the sliding engagement of the under face 69 of the roof with the longitudinally extending cross, or tie, rod 61. It will be noted that rod 61 becomes a perch rod when the roof 62 is removed. Preferably a pair of bars 71 and 72 of rigid material such as aluminum are each fixed along the forward edge 66 or the rearward edge 65 of roof 62 to lend additional rigidity to the structure while still permitting flexible sliding in the grooves 54 and 55. The bars 71 and 72 are of U shaped cross section pressed on, or adhesively united onto the edge of the roof and since they are about equal in length to the space between the inner faces of the side walls they also serve to guide the roof 62 in the grooves to thereby prevent binding.

The bird feeder 20 is preferably about twenty inches long, eight and one half inches wide and six and three eighths inches high, overall measurements and may be shipped and stored in a flat package for easy assembly by the user. The roof 62 is preferably of Cellulose Acetate Butyrate plastic sheeting about two hundredths of an inch in thickness and the side walls and floor may be of plastic such as "Bakelite" of about one eighth inch in thickness. The tie rod 61 is preferably of wood to provide a foothold when serving as a perch with the roof 62 entirely removed.

The rod 61 is detachably affixed, at each opposite end, in sockets 58 and 59, by means of screws such as 74 driven through suitable pre-formed holes in the side walls 40 and 41 to strengthen the upper portion of the bird feeder 20.

I claim:

1. A bird feeder comprising a rectangular floor having forward, rearward and opposite side edges; a pair of upstanding side walls attached to said floor proximate said side edges, each said side wall being of substantially arcuate outline and having a continuous, substantially arcuate groove terminating in opposite, open ends, in the inner face thereof, and a unitary, flexible, transparent, self supporting roof of substantially arcuate section extending between said side walls, said roof having forward and rearward edges at predetermined spaced distances from the corresponding edges of said floor and having side edges supported in, and freely slidable in, said arcuate side wall grooves for slidably adjusting the said distances or slidably removing said roof.

2. A bird feeder as specified in claim 1 wherein said roof is of smooth, hard faced, impermeable, transparent plastic sheet material for denying a foothold to large birds or bird enemies.

3. A bird feeder as specified in claim 1 wherein said floor, side walls and roof are all of plastic material and the exterior faces thereof are smooth and hard faced for denying a foothold to creatures other than small birds.

4. A bird feeder as specified in claim 1 wherein said unitary roof includes a pair of bars of rigid material, each bar fixed along the rearward and forward edge thereof for sliding therewith in said grooves.

5. A bird feeder as specified in claim 1 wherein said upstanding side walls include forward portions overhanging the forward edge of said floor, said overhanging portions cooperating with the forward edge of said roof to deny access of large birds to a foothold on said floor.

6. A bird feeder as specified in claim 1 plus a combined tie rod and perch rod fixed at each opposite end to the upper, central portions of said side walls, said rod being juxtaposed to said roof for supporting the same and extending parallel to said floor to serve as a perch when said roof is removed.

7. A bird feeder as specified in claim 1 wherein said floor is formed of hard, smooth plastic recessed in the upper face thereof to form a bird tray and said side walls are formed of hard smooth plastic recessed in the inner faces thereof to form said open ended, substantially particircular grooves.

8. A bird feeder comprising an elongate floor of hard plastic material, said floor having elongate forward and rearward edges, opposite side edges, an upper face recessed for forming a bird tray and a smooth, hard lower face; a pair of vertical side walls of said hard plastic material, demountably fixed proximate the side edges of said floor, each said side wall having an arcuate outline, a hard smooth outer face and an arcuate groove in the inner face thereof extending upwardly from an open end at the rearward edge of said floor, thence forwardly and thence downwardly to an open end at a spaced distance from the forward edge of said floor and a unitary, rounded roof of transparent, flexible, hard, smooth plastic material, said roof having elongate forward and rearward edges each at a spaced distance from the corresponding forward and rearward edge of said floor and having its side edge portions supported in, and freely slidable in, said side wall grooves for forming an adjustable, removable, horseshoe arched cover for said bird feeder.

9. A combination as specified in claim 8 plus a pair of reinforcing bars of less length than the length of the space between said grooves, each said bar being fixed along the forward or rearward edge of said roof for sliding therewith in said grooves while reinforcing said edges against deformation.

10. In a bird feeder having a floor and a pair of opposite side walls, the combination of oppositely disposed, arcuate grooves in the inner faces of said side walls, each groove having opposite open ends, each at a spaced distance from said floor; and a unitary, flexible, transparent, self supporting, smooth arcuate roof extending between said side walls, said roof having its opposite side edges slidably supported in said grooves and its forward and rearward edges at predetermined spaced distances from the corresponding edges of said floor to form forward and rearward openings therewith, adjustable in height.

References Cited in the file of this patent

UNITED STATES PATENTS

| | | |
|---|---|---|
| D. 119,588 | Hyde | Mar. 26, 1940 |
| 2,606,652 | Jaquette et al. | Aug. 12, 1952 |
| 2,690,216 | Scott | Sept. 28, 1954 |
| 2,707,454 | Wilkinson | May 3, 1955 |
| 2,858,801 | Chance | Nov. 4, 1958 |
| 2,918,901 | Poulsen | Dec. 29, 1959 |